(12) United States Patent
Klingelhöfer

(10) Patent No.: US 8,445,833 B2
(45) Date of Patent: May 21, 2013

(54) OPTOELECTRONIC SENSOR

(75) Inventor: Christian Klingelhöfer, Freiburg (DE)

(73) Assignee: Sick AG, Waldkirch (DE)

( * ) Notice: Subject to any disclaimer, the term of this patent is extended or adjusted under 35 U.S.C. 154(b) by 345 days.

(21) Appl. No.: 13/032,985

(22) Filed: Feb. 23, 2011

(65) Prior Publication Data

US 2011/0206366 A1 Aug. 25, 2011

(30) Foreign Application Priority Data

Feb. 25, 2010 (EP) ..................................... 10154691

(51) Int. Cl.
*H04B 10/08* (2006.01)

(52) U.S. Cl.
USPC .................. 250/221; 250/559.4; 250/214 DC

(58) Field of Classification Search
USPC ................................ 250/221, 559.4, 214 DC
See application file for complete search history.

(56) References Cited

U.S. PATENT DOCUMENTS

| | | | | |
|---|---|---|---|---|
| 5,003,169 A | * | 3/1991 | Sakaguchi et al. | 250/221 |
| 5,015,840 A | * | 5/1991 | Blau | 250/221 |
| 6,236,036 B1 | * | 5/2001 | Kudo et al. | 250/221 |

FOREIGN PATENT DOCUMENTS

| | | |
|---|---|---|
| DE | 90 10 998.8 U1 | 10/1990 |
| DE | 43 24 590 C2 | 6/1995 |
| DE | 195 25 057 C1 | 2/1997 |
| DE | 199 14 114 A1 | 10/1999 |
| DE | 100 06 634 C1 | 4/2001 |
| DE | 100 38 025 A1 | 3/2002 |
| DE | 103 55 008 A1 | 6/2005 |
| DE | 103 59 782 A1 | 7/2005 |

OTHER PUBLICATIONS

European Search Report issued Aug. 3, 2010, in priority European Application No. 10154691.9, five (5) pages.

\* cited by examiner

*Primary Examiner* — Tony Ko
(74) *Attorney, Agent, or Firm* — Nath, Goldberg & Meyer; Jerald L. Meyer; Stanley N. Protigal

(57) ABSTRACT

An optoelectronic sensor, comprising a first strip having transmitter elements and/or receiver elements, a second strip having transmitter elements and/or receiver elements, wherein the transmitter elements of one strip form transmitter/receiver pairs with receiver elements of the other strip for the formation of a protective field, and an evaluation unit for the evaluation of the received light of the receiver elements, wherein a light beam between the transmitter elements and receiver elements counts as interrupted when received light falls below a first lower switching threshold and as not interrupted when a first lower switching threshold is exceeded and wherein an object detection signal can be transmitted when at least one light beam is interrupted, characterized in that for the evaluation of the received light of at least one receiver element a second upper switching threshold is provided in the evaluation unit the value of which lies above the value of the first lower switching threshold, with a signal to indicate bypass light being given when the value of the received light lies above the second upper threshold.

7 Claims, 2 Drawing Sheets

Figure 1:
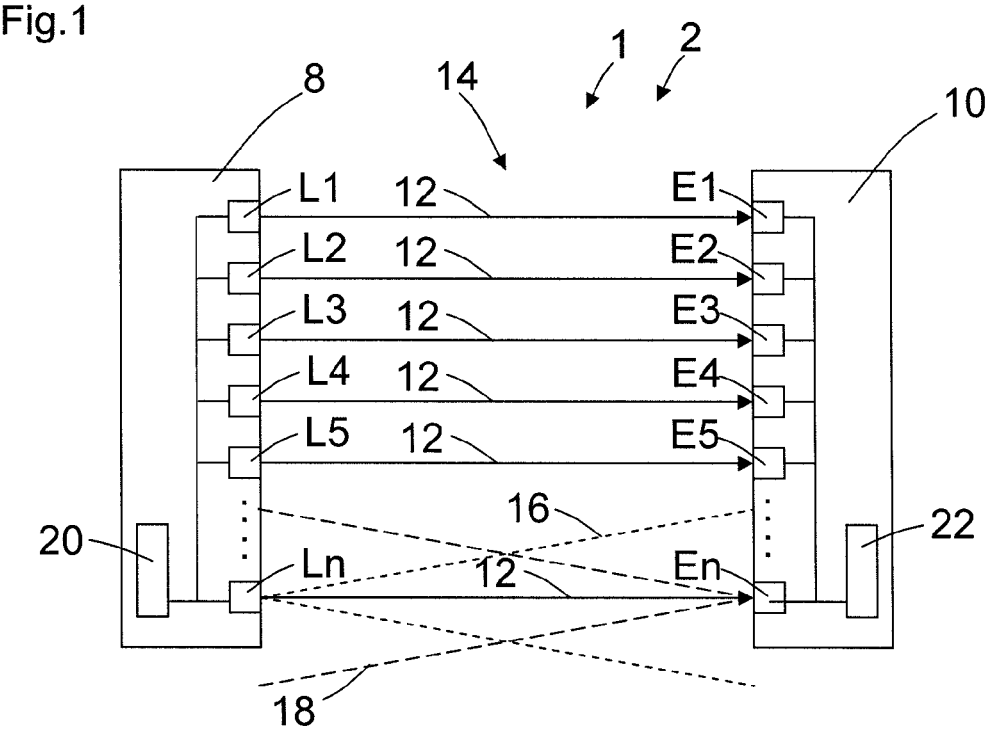

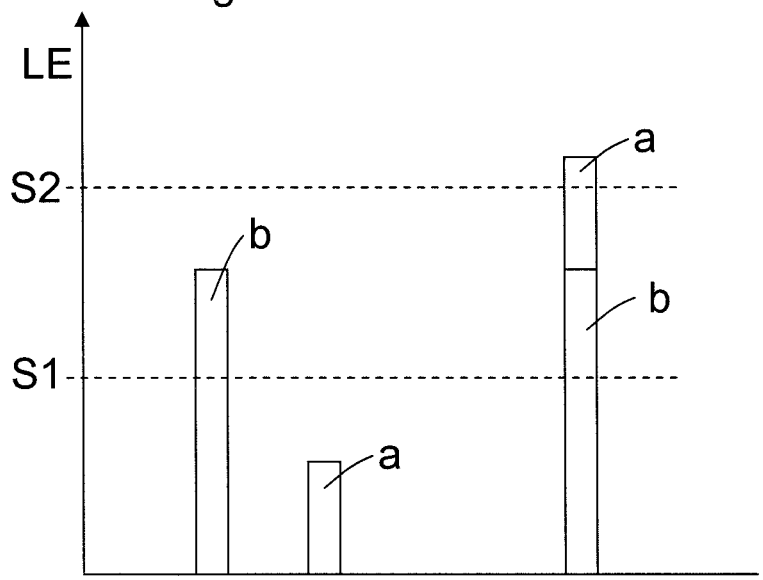
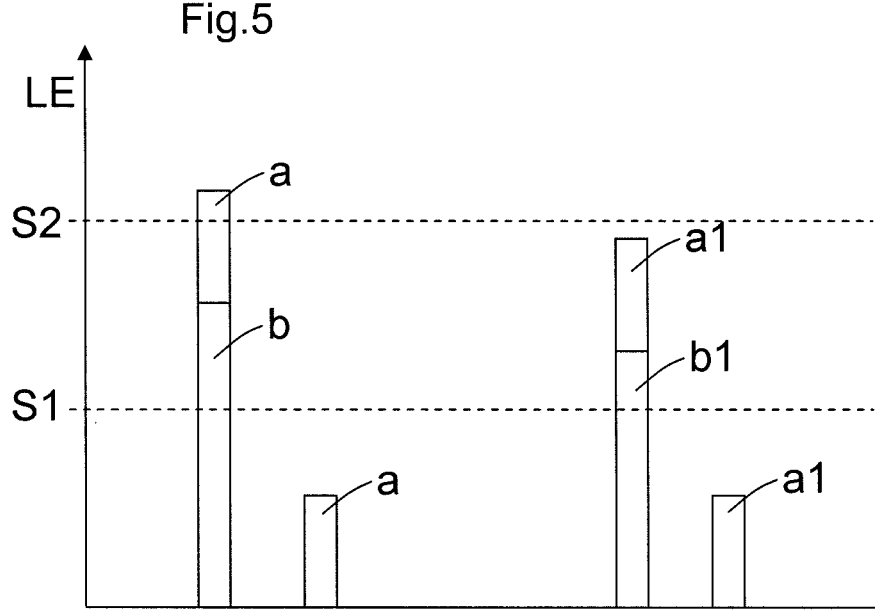

OPTOELECTRONIC SENSOR

The invention relates to an optoelectronic sensor and in particular to an optoelectronic sensor, comprising a first strip having transmitter elements and/or receiver elements, a second strip having transmitter elements and/or receiver elements, wherein the transmitter elements of one strip form transmitter/receiver pairs with receiver elements of the other strip for the formation of a protective field, and an evaluation unit for the evaluation of the received light of the receiver elements, wherein a light beam between the transmitter elements and receiver elements counts as interrupted when received light falls below a first lower switching threshold and as not interrupted when a first lower switching threshold is exceeded and wherein an object detection signal can be transmitted when at least one light beam is interrupted.

An optoelectronic sensor of this kind is, for example, used at machines to provide security for persons against movements which can be dangerous. If a person reaches into a protected field formed by light beams at least one light path will be interrupted. This leads via a secure output to the outputting of a signal to the machine control in order to stop the endangering movement for the protection of the person.

Optoelectronic sensors are used to protect operating personal against potentially dangerous movements of the machine with respect to movements through the machine or on reaching into the machine. The corresponding safety norms such as for example EN 954 and/or IEC 61508 must be fulfilled in this respect.

A light barrier arrangement is known from DE 199 14 114 A1 with an upper and a lower switching threshold which can be automatically set in response to incident transmitted light. An exceeding of the upper threshold leads to a readjustment of the upper switching threshold.

A light grid having individual light barriers is disclosed in DE 100 38 025 C2 in which a lower threshold value and an upper threshold value are determined. If the transmitted light exceeds the lower threshold value then the transmitted light is classified as attenuated. If the transmitted light exceeds the upper threshold value then the transmitted light is regarded as sufficient.

In the light grids in accordance with the prior art it is, however, possible for light beams of the transmitter to reach the receiver through specularly reflecting surfaces or reflecting surfaces in the vicinity of the protective field, despite the fact that an object is located in the protected field, so that the interruption is not recognized. In the specialist field this is normally referred to as bypass reflection.

In order to avoid this the light of the light transmitters is radiated in the known light grids in a narrow emission angle, so that a transmitted light cone having an angle of opening of ±5° to ±10° results. The received light cone is mounted in the same way. Moreover, as an organizational measure it is required that no specularly reflecting surfaces are permitted within the transmitted light cone and the received light cone.

Through the angular restriction of the transmitted light and of the received light an alignment of the light transmitters and the light receivers relative to one another is very difficult because a precise adjustment takes place of the light transmitters onto the receivers. Furthermore, if for example vibrations occur then an availability of the sensor is restricted because it can transpire that through this sufficient light can no longer be incident on the light receiver.

If specularly reflecting surfaces are prohibited as an organizational measure in the vicinity of the protected field, then the use of safety light grids is considerably more difficult or indeed impossible in applications in which partly specular reflecting surfaces are present in the prohibited zone, for example when steel tools or sheet steel are present as workpieces.

The invention is based on the object of making available an optoelectronic sensor which is able to recognize bypass light beams. A further object consists in avoiding the previously necessary angular restriction of the transmitted light and of the received light.

The object is satisfied by an optoelectronic sensor comprising a first strip having transmitter elements and/or receiver elements, a second strip having transmitter elements and/or receiver elements, wherein the transmitter elements of one strip form transmitter/receiver pairs with receiver elements of the other strip for the formation of a protective field. Furthermore, an evaluation unit is provided for the evaluation of the received light of the receiver elements, wherein a light beam between the transmitter elements and receiver elements counts as interrupted when received light falls below a first lower switching threshold and as not interrupted when a first lower switching threshold is exceeded. An object detection signal can be transmitted when at least one light beam is interrupted. For the evaluation of the received light of at least one receiver element a second upper switching threshold is provided in the evaluation unit the value of which lies above the value of the first lower switching threshold, with a signal to indicate bypass light being given when the value of the received light lies above the second upper threshold.

In this way it is possible to detect bypass light even when the direct light path between one transmitter element and the associated receiver element is free, because the light of the direct light path is added to the deflected or bypass light and thus the upper second switching threshold is exceeded. For this purpose, the second switching threshold is set such that a sum of direct light beams from the light transmitter and deflected or bypass light beams lies above the second switching threshold.

As a result of the signal to indicate the bypass light a warning signal, a visual display or also a stop signal for an endangering movement can be transmitted. In the case of the warning signal or of the visual display a user is made aware that a disadvantageous bypass situation is present and can if required remove this or prevent this. However, provision can also be made for the transmission of a stop signal as a results of detected bypass light in order, in the event, that bypass light is detected, to either stop an endangering movement or to ensure that the machine and the endangering movement cannot be started. In this way it is ensured that no danger to persons can arise as a result of the bypass light.

The first lower switching threshold is advantageously set such that scattered or bypassed light lies beneath this first lower switching threshold. This is achieved in that the switching threshold of the receiver elements or the transmitter power of the transmitter elements is set such that, for the direct light beam, the receiver elements just receive sufficient light in order to validly find a free direct light path. Bypass light is correspondingly attenuated by the light deflection and does not lead to a valid received signal on its own. Through this condition it is ensured that despite the direct light beam between the transmitter element and the receiver element being covered the deflected light beams or bypass light do not lead to sufficient light falling on the light receiver element and in this way to the object detection signal being erroneously reset.

In a further development of the invention the value of the upper second switching threshold is smaller than twice the value of the lower first switching threshold, with the light energy of direct light beams being set to be smaller than or equal to the second upper switching threshold. In this way a maximum signal reserve of the direct light beam i.e. of the useful signal is achieved. Furthermore, a situation is achieved in which, for the weakened operational signal and a scattering signal either the bypass light is recognized when the direct light beam is not interrupted or however the light energy of the bypass light beam is not sufficient in order to exceed the lower first switching threshold.

The lower first switching threshold is set to be smaller than or equal to the light energy of direct light beams. In this way bypass light beams whose light energy lies beneath the light energy of the direct light beam do not lead to a valid signal.

In a preferred embodiment the optoelectronic sensor is designed as a safety light grid and must satisfy the safety norms for example EN 954 and/or IEC 61508.

For light grids in which transmitter elements and also receiver elements are both present in one strip, the light energy of the transmitter elements can be automatically adapted via an optical outward and return channel. Alternatively, this can also take place via a different communication connection between the two auxiliary disposed strips, for example via a galvanic connection.

Since the light energy transmitted by the transmitter elements is inversely proportional to the square of the spacing, light energy can also be preset via a determination of the spacing. An automatic determination of the spacing between light grid strips can for example be carried out in accordance with EP 1 544 643.

In a further development of the invention the transmitter elements are set, so that in each case these all ensure approximately constant light energy on the associated receiver elements. Then, the light energy is uniformly changed depending on the spacing between the light grid strips but only at all transmitter elements. This achieves a situation in which a mirror bypassing of individual beams can be recognized by comparison with the received signals of non-bypass beams. A uniform mirror bypassing of all transmitter element/receiver element pairs of a light grid is in this respect regarded as adequately improbable.

In the operation of a plurality of the safety light grids in direct vicinity to one another the receiver elements do not as a rule only receive the light of the associated transmitter element but rather also light from other transmitter elements. In order to prevent the evaluation of non associated transmitter elements with a receiver element the light beams can be differently coded. For example, in the time range in time multiplex operation or in the frequency range by pulse pattern codes or pseudo random noise codes.

Such coding processes are particularly effective through the present invention. Hitherto such coding processes could only be restrictedly used because the light pulses could cause saturation effects in the light receivers due to their light energy and thereby greatly deform the received pulses so that for safety reasons an object detection signal was triggered as a consequence which led to a restricted availability.

The receiver elements and the evaluation unit however operate in accordance with the invention in a linear working range. This signifies that the receiver elements and the evaluation unit are not put in saturation by the received light. In this way the availability of the optoelectronic sensors, in particular of light grids, is increased because in this way a functional reserve is provided. Furthermore, a realization of many more codes is possible than hitherto since the different codes can be better recognized and resolved as a result of an improved sensitivity in the linear working range and can thus be better separated from one another.

In the following the invention will be explained in detail with respect to embodiments and with reference to the drawing.

Figure 2:
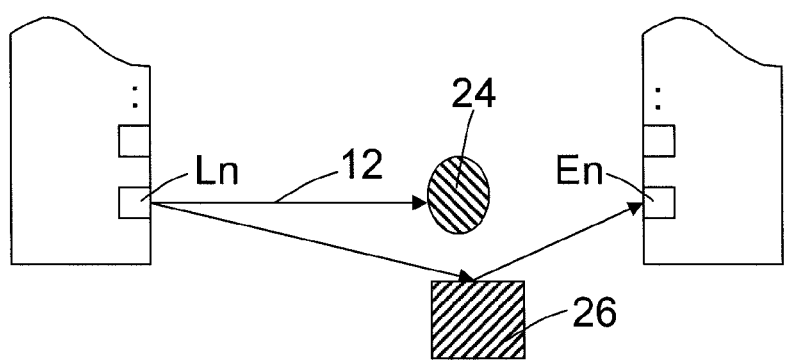
Figure 3:
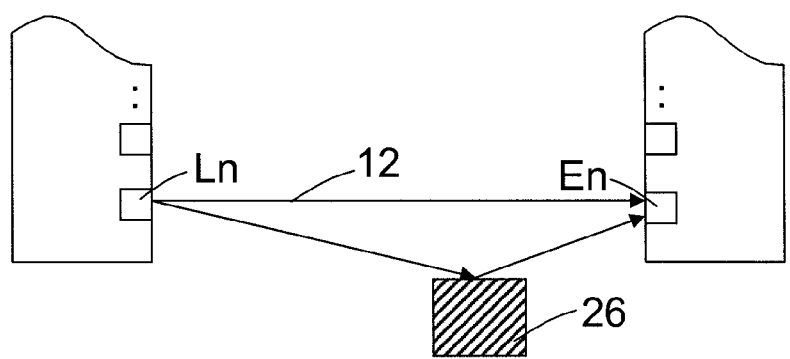

In the drawing there is shown:

FIG. 1 a schematic representation of an optoelectronic sensor in accordance with the invention;

FIGS. 2 and 3 a schematic illustration of a light beam subject to bypass reflection;

FIGS. 4 and 5 a schematic illustration of switching threshold values.

FIG. 1 shows an optoelectronic sensor 1, in particular a safety light grid 2 consisting of a first strip 8 and a second strip 10. The two strips 8 and 10 are arranged confronting one another. The transmitter elements L1 to Ln of the first strip 2 thereby transmit light which is received by the receiver elements E1 to En of the second strip 10, whereby transmitter/receiver pairs are formed illustrated by the optical light beams 12. In this connection the number of transmitters does not necessarily have to be the same as the number of the receivers. In this way a protective field 14 is formed between the two light strips 8 and 10. A safety light grid 2 of this kind is for example used at machines to secure against movements which potentially endanger people. If a person reaches into the protective field 14 then at least one light beam 12 is weakened or interrupted. This leads, via a secure output that is provided, to the outputting of a signal to a machine control in order to stop the endangering movement to protect the person.

The safety light grid 1 can also be a light grid with identical transmitter/receiver strips in accordance with EP 1 870 734.

The transmitter elements L1 to Ln thereby consist of a transmitter component, for example a light emitting diode and an optical transmitting system consisting of a diaphragm and/or one or more lenses. The receiver elements E1 to En are build up analogously thereto of a photosensitive component and an optical system. The optical axes of the transmitter elements and receiver elements of a strip are aligned parallel to one another in this arrangement.

The light of the transmitter elements L1 to Ln is transmitted in the form of a transmitted light cone 16 shown at the transmitter element Ln in accordance with the broken lines as an example for all transmitter elements L1 to Ln. The receiver elements likewise have a reception cone 18 within which light is received, shown for example at the receiver element En by further broken lines which start from the receiver element En. The larger the opening angle of the light cones are, the simpler it is to align the two strips to one another.

For their activation the transmitter elements L1 to Ln are connected to a control unit 20. For the evaluation the receiver elements E1 to En are connected to an evaluation unit 22. If the transmitter elements L1 to Ln and receiver elements E1 to En are integrated together in one strip in each case, then a combined control and evaluation unit is provided in each case. The transmitter elements L1 to Ln in accordance with FIG. 1 are activated one after the other by the control unit 20 and this activation can take place in pulsed manner to suppress extraneous light signals. The receiver elements E1 to En are evaluated one after the other by the evaluation unit 22 with respect to the reception of the light pulses of the oppositely disposed transmitter elements L1 to Ln. In order that the two strips 8 an 10 can cooperate in order to span the protected field 14 the pairs of transmitter elements L1-Ln and receiver elements E1-En are aligned and/or tuned to one another to form light paths, so that, for example, the receiver element E1 only receives light from the transmitter element L1. For this purpose the evaluation unit 22 has means for the time synchronization. The evaluation unit 22 can thus synchronize the evaluation of the receiver elements E1 to En to the transmitter pulses of the oppositely disposed transmitter elements L1 to Ln, whereby the light paths are defined by the light beams 12.

FIG. 2 shows the light grid of FIG. 1 by way of example with a transmitter element Ln and a receiver element En. The light beam 12 is interrupted by the object 24 or by a person, so that no light passes directly from the transmitter element Ln into the receiver element En. In this case an object detection signal should and is transmitted in order for example to stop an endangering movement of a machine.

In addition the transmitter light of the transmitter element enters into the receiver element En in undesired manner by circumvention via a reflecting object 26, sometimes referred to as bypass light or bypass reflection. However, this should not result in the object detection signal being cancelled.

FIG. 3 shows an identical arrangement to FIG. 2 with however the object 24 of FIG. 2 no longer being present so that the light beams 12 pass directly from the transmitter element Ln to the receiver element En. The light beam 12 is however further deflected by the reflecting object 26 onto the receiver element. In this case a signal for the indication of bypass reflection, in particular a warning signal, a visual display or a stop signal is transmitted, the latter leads to the endangering movement being stopped in order to protect persons from an endangering movement as a result of a possible faulty recognition of light beams.

FIG. 4 shows a schematic diagram with a first lower switching threshold S1 and a second upper switching threshold S2 for the explanation of the FIGS. 2 and 3. The light energy LE is entered onto the vertical axis. The light energy b of the direct light beam 12 is in this connection specified with a bar. The light energy a of the deflected light beam is likewise shown by a bar. The light energy a of the deflected light beam is reduced as a result of the reflection at the reflecting object 26 with respect to the direct light beam. The sum of the light energies a and b which arise at the receiver element is represented by the bars which are arranged above one another.

In order to detect the bypass light beam the light energy LE incident at the receiver element EN is not only monitored in accordance with the present invention for the exceeding of the lower first threshold value S1 but rather also for an upper second switching threshold S2 in accordance with FIG. 4 not been exceeded.

The settings named in the following can be effected by changing the switching thresholds for the receiver side or by setting the transmitted light strength for given set switching thresholds.

The switching thresholds are selected such that the light energy b of a direct beam exceeds the lower first switching threshold S1, i.e. S1<b, and such that the light energy a of the scattered beam lies below the lower first switching threshold, i.e. S1>a and thus b>S1>a.

The upper second switching threshold S2 is so placed that the sum of the light energy b of the direct light beam and the light energy a of the deflected light beam exceed the upper switching threshold S2, the upper second switching threshold S2 is however larger than the light energy b of the direct beam, i.e. a+b>S2>b.

From this results: a+b>S2>b>S1>a.

In order to achieve this condition the light energy of the transmitter element or the sensitivity and/or the amplification of the receiver element are so set for each beam path of pairs of an associated transmitter element and an associated receiver element that the range between the lower switching threshold S1 and the second upper switching threshold S2 lies in a linear working range of the receiver element and of the evaluation unit.

The sensitivity/amplification of the receiver elements can also be fixedly set and the light energy of the transmitter elements adapted and/or set accordingly.

In a further development of the invention the following conditions are observed in accordance with FIG. 5. The upper second switching threshold S2 is smaller than twice the value of the lower first switching threshold S1, i.e. S2<2×S1, the light energy b of the direct light beam being approximately the same as the upper second switching threshold S2, i.e. b≅S2, however the light energy b of the direct light beam is smaller than the upper second switching threshold S2, i.e. b<S2.

Furthermore, the lower first switching threshold S1 is approximately set equal to the light energy b of the direct light beam, with the light energy b of the direct light beam being selected to be larger than the first switching threshold S1. In this way bypass light beams of which the light energy almost corresponds to the light energy of the direct light beam do not lead to a valid signal. The light energy a of the mirror deflected light can in this respect correspond approximately to the light energy b of the direct light beam, i.e. a≅b.

Furthermore, FIG. 5 shows the uncritical case in which the sum of the light energy b1 of the direct light beam and the light energy a1 of the deflected light beam does not exceed the upper second switching threshold since, when the direct light beam is shielded, it is only the light energy a1 of the bypass light beam that is relevant which does not exceed the first lower switching threshold and in this case an object detection signal is transmitted.

REFERENCE NUMERAL LIST 1 optoelectronic sensor
2 light grid
4 transmitter elements
6 receiver elements
8 first strip
10 second strip
12 light beam
14 protected field
16 transmitted light cone
18 received cone
20 control unit
22 evaluation unit
24 object
26 reflecting object
LE light energy
L1-Ln transmitter elements
E1-En receiver elements
S1 lower first switching threshold
S2 upper second switching threshold
a, a1 light energy of the deflected/bypass light beam
b, b1 light energy of the direct light beam

The invention claimed is:

1. An optoelectronic sensor, comprising
a first strip (8) having transmitter elements (L1-Ln) and/or receiver elements (E1-En), a second strip (10) having transmitter elements (L1-Ln) and/or receiver elements (E1-En), wherein the transmitter elements (L1-Ln) of one strip (8, 10) form transmitter/receiver pairs with receiver elements (E1-En) of the other strip (10, 8) for the formation of a protective field (14), and an evaluation unit (22) for the evaluation of the received light of the receiver elements (E1-En), wherein a light beam (12) between the transmitter elements (L1-Ln) and receiver elements (E1-En) counts as interrupted when received light falls below a first lower switching threshold (S1)

and as not interrupted when a first lower switching threshold (S1) is exceeded and wherein an object detection signal can be transmitted when at least one light beam (12) is interrupted, wherein for the evaluation of the received light of at least one receiver element (E1-En), a second upper switching threshold (S2) is provided in the evaluation unit (22) the value of which lies above the value of the first lower switching threshold (S2), with a signal to indicate bypass light being given when the value of the received light lies above the second upper threshold (S2).

2. An optoelectronic sensor in accordance with claim 1, wherein the first lower switching threshold (S1) is set such that the light energy (a) of scattered light, deflected light or bypass light lies beneath the lower threshold value (S1).

3. An optoelectronic sensor in accordance with claim 1, wherein the value of the upper second switching threshold (S2) is smaller than twice the value of the lower first switching threshold (S1), with the light energy (b) of direct light rays being smaller than or the same as the second upper switching threshold (S2).

4. An optoelectronic sensor in accordance with claim 1, wherein the lower first switching threshold (S1) is smaller than or equal to a light energy (b) of direct light beams.

5. An optoelectronic sensor in accordance with claim 1, wherein the transmitter elements (L1-Ln) are so set that these can all lead to the same light energy (b) on the associated receiving elements (E1 to En) and the light energy (b) can be changed in dependence on the spacing between the transmitter elements (L1-Ln) and receiver elements (E1 to En) only at all transmitter elements (L1-Ln) to the same extent.

6. An optoelectronic sensor in accordance with claim 1, wherein the light beams (12) from different transmitter receiver pairs are differently coded.

7. An optoelectronic sensor in accordance with claim 1, wherein it is a safety light grid (2).

* * * * *